Dec. 31, 1935.  C. A. CAMPBELL  2,025,847
AIR BRAKE
Filed Oct. 13, 1933    4 Sheets-Sheet 1

Inventor
Charles A. Campbell
By
Attorneys

Dec. 31, 1935.　　　　　C. A. CAMPBELL　　　　　2,025,847
AIR BRAKE
Filed Oct. 13, 1933　　　　4 Sheets-Sheet 2

Fig. 3
RELEASE

Fig. 4
MAINTAINING

Fig. 5
SERVICE

Fig. 6
LAP

Fig. 7
EMERGENCY

Inventor
Charles A. Campbell
By
Dodge and Im.
Attorneys

Dec. 31, 1935.   C. A. CAMPBELL   2,025,847
AIR BRAKE
Filed Oct. 13, 1933   4 Sheets-Sheet 4

Inventor
Charles A. Campbell

Attorneys

Patented Dec. 31, 1935

2,025,847

UNITED STATES PATENT OFFICE 2,025,847

AIR BRAKE

Charles A. Campbell, Watertown, N. Y., assignor to The New York Air Brake Company, a corporation of New Jersey Application October 13, 1933, Serial No. 693,521

26 Claims. (Cl. 303—35)

This invention relates to air brakes of the well-known automatic type and is directed to the control of brake pipe pressure in making service applications.

It is well known that under running conditions, with a long and leaky brake pipe, there may be a disparity of as much as 15 pounds between brake pipe pressure at the head of the train and the brake pipe pressure at the rear of the train. As a result of this, even though the auxiliary reservoirs at the forward end of the train are fully charged, those at the rear of the train can be only partially charged, the state of charge of the reservoirs varying progressively between the two ends of the train.

When the engineer shifts his brake valve to service and then to lap position, as he does in making a service application, he terminates feeding action of the feed valve. Since such feeding action is the sole cause for the existence of the pressure gradient in the brake pipe, flow to the rear starts in the brake pipe, and when brake pipe pressure levels off throughout the length of the train, the actual reduction in brake pipe pressure at the front of the train is materially greater than that at the rear of the train. This disparity in the reduction of brake pipe pressure at the two ends of the train, combined with the disparity in the charges in the reservoirs at the two ends of the train, causes the brakes at the front of the train to apply much more heavily than those at the rear. There is an inherent tendency for the brakes at the front end to apply first and the cumulative effect of the conditions above outlined is very harsh slack action entailed by the run-in of the slack.

An obvious theoretically possible solution of the problem is to provide means for feeding air to the brake pipe in service and lap positions, but under conditions which will insure a lowered brake pipe pressure. The idea is to preserve the pressure gradient during an application so that all the triple valves will be affected similarly throughout the length of the train. It has been proposed to control the feeding of air to the brake pipe, while the brake valve is in lap position, by a pressure reducing valve responsive to brake pipe pressure at the engineer's brake valve, but neither this nor any other mechanism heretofore proposed and known to me, meets the varying conditions of service which result from wide variations in brake pipe leakage, variations in the length of the train, and the more or less erratic action of pressure reducing feed valves, particularly those whose delivery pressure must be varied.

The present invention is based on the fact that if the brakes at the forward end of the train can be prevented from applying fully for a period sufficient to permit the slack to bunch, the subsequent heavier application of the forward brakes of the train would have little or no harmful effect. Stated in terms of function, the system of the prior art sought to establish what might be called a constant maintaining action, that is, air would be fed constantly to the brake pipe throughout an application, with the idea of counteracting a supposedly constant brake pipe leakage. According to the present invention the proposal is to feed air to the brake pipe during the initial part of an application, at a rate approximately sufficient to maintain the pressure gradient throughout the brake pipe, the rate of such feed being diminished so that the maintenance gradually fades out and the pressure in the brake pipe gradually levels off. The overall duration of such maintaining feed is preferably little more than sufficient to cover the period of slack action, say thirty seconds.

The maintaining feed just suggested may have the characteristics of constant maintenance for the initial portion of the maintaining period and then may be gradually diminished until the maintenance fades out, or the diminution of the rate of maintenance may start at the commencement of maintenance and continue until it fades out. The gradual diminution and fade out, as contradistinguished from sudden termination of the maintenance, is a very important feature of the invention.

The above being the general operative characteristics of the method, a convenient mechanism for embodying it involves the use of an equalizing discharge engineer's brake valve in conjunction with an equalizing reservoir and a measuring chamber. The brake valve is given a special position called maintaining position, for lack of a better name. In this position it connects the equalizing reservoir with a definite volume so that equalizing pressure is reduced a definite amount, say 5 pounds per square inch. This causes the equalizing discharge valve to function to effect a similar reduction of brake pipe pressure at the engineer's brake valve and such a reduction is sufficient to initiate the serial action of the quick service vent valve mechanism associated with conventional triple valves.

The measuring chamber just mentioned is connected with the equalizing reservoir only in maintaining position, but in this position the two become a combined volume and operate a pressure reducing valve which feeds air to the brake pipe as soon as brake pipe pressure drops a slight amount, say 1 pound per square inch, below the pressure in the equalizing reservoir. By placing the actuating abutment of the maintaining valve in the measuring chamber, the maintaining valve mechanism is isolated and rendered inactive except when the measuring chamber is connected with the equalizing reservoir. It may also be used to supplement the feed valve particularly when the engineer's brake valve is first moved to running position.

A bleed port is provided which connects the measuring chamber and consequently also the equalizing reservoir with the brake pipe. Remembering that brake pipe pressure tends to drop below equalizing reservoir pressure as the result of flow to the rear of the brake pipe, and that in extreme cases the flow is so fast that the equalizing discharge valve may never open, the effect of the bleed port is to produce a gradual equalization between equalizing reservoir and brake pipe pressures by flow to the brake pipe. This action produces and controls the diminution and gradual fade out of the maintaining action.

Where it is desired to have constant maintenance for a short period followed by diminishing maintenance, use is made of a timing mechanism, preferably a charged timing reservoir which is vented at a slow rate in maintaining position, the timing device controlling a valve which at first closes but later opens a bleed port between the measuring chamber and the brake pipe. So long as the bleed port is closed, pressure in the equalizing reservoir and measuring chamber remains fixed, and the maintaining valve operates to establish a constant brake pipe pressure adjacent the engineer's brake valve. When the bleed port is opened the regulating pressure on the maintaining valve gradually diminishes and therefore the maintained pressure gradually diminishes to a point at which equalization of brake pipe and equalizing reservoir pressures occur.

The preferred form of the invention includes this timing mechanism.

Two embodiments of the invention will now be described in detail in connection with the accompanying drawings, in which,—

The engineer's brake valve is shown in running position.

In the above figures the engineer's brake valve is more or less diagrammatically represented, that is to say, the ports are illustrated as if they all lay in a single plane of section, which ordinarily would not be the case in actual practice.

Refer first to Figs. 1 to 7 inclusive:

The body of the engineer's brake valve is made up of four parts connected together and sealed to each other by gaskets in a familiar way. The main components are, the pipe bracket portion 21, the equalizing portion 22, the rotary valve seat portion 23, and the cap 24. The cap encloses the rotary valve 25 which turns on the rotary valve seat in the usual manner. The rotary valve is turned by a key 26 which is swiveled in the cap 24 and sealed against leakage by gasket 29. The rotary valve is set in its various positions by a valve handle 27, of familiar form. A coiled compression spring 28 acts to seat the valve 25 and also to seal the key 26 against the gasket 29.

The main reservoir pipe 31 is connected with pipe bracket 21 and communicates by a passage 32 with a space within the cap 24 above the rotary valve 25. The feed valve, not shown, but of ordinary type, is connected to supply air through the pipe 33, and this leads to the feed valve port 34 in the seat of the rotary valve. A branch pipe 35 leads from the brake pipe 122 (Fig. 15) through the double-heading cock 36 and is connected with the pipe bracket 21. It communicates by a passage 37 with two ports 38, 39, in the rotary valve seat. Passage 37 also communicates by lateral passage 41 with a space below the actuating abutment of the equalizing discharge valve. This actuating abutment is illustrated as taking the form of a flexible diaphragm 42 suitably clamped in the portion 22 of the brake valve body and actuating an equalizing discharge valve 43. This seats on a valve seat formed in the bushing 44 and controls exhaust flow through a restricted port 45, the size of the port being suitably chosen to control the rate of venting flow from the brake pipe through the equalizing discharge valve. The space above the equalizing discharge valve is in communication with a port 46 in the seat for the rotary valve.

There is an atmospheric exhaust port 47 with a branch 48. The control reservoir pipe 49 communicates with a port 51 in the rotary valve seat while the release pipe 52 communicates with a port 53 in the valve seat. The equalizing reservoir port 54 in the valve seat is connected through pipe 55 with the equalizing reservoir 56, here shown as one chamber of a multi-chambered hollow casting. A measuring chamber port 57 in the valve seat is connected by way of pipe 58 to the measuring chamber 59, formed in the same casting with the chamber 56. Port 61 is connected by pipe 62 to the emergency relay valve, not shown, but of ordinary construction.

The timing chamber port 63 in the rotary valve seat, leads by way of pipe 64 to the timing chamber 65 formed in the same casting with the chambers 56 and 59. The port 66 in the rotary valve seat supplies a connection to the pump governor under the control of the rotary valve, as will be explained.

The rotary valve is provided with a through port 67 which in release and running positions supplies main reservoir air to the port 66 and consequently to the pump governor. On its lower face it has a cavity 68 (see Fig. 1) which, in running position, connects the feed valve port 34 with the brake pipe port 38. At the same time another loop port 69 connects the brake pipe port 39 and the port 46 leading to the space above the equalizing discharge diaphragm 42. An extension 71 of the port 69 connects the port 46 with the equalizing reservoir port 54, a choke 72 being interposed in the extension 71.

The purpose of using the choke 72 is to preclude opening of the equalizing discharge valve when the rotary valve is turned directly to running position after service application. It produces the result by preventing the equalizing reservoir from absorbing air too rapidly and thus throwing the diaphragm 42 out of balance.

In running position the loop port 74 places the release port 53 in free communication with exhaust port 47, and a branch of the port 74, in which is interposed a choke 75, places measuring chamber port 57 in restricted communication with the exhaust port 47. In running position a through port 76 supplies main reservoir air to the timing chamber port 63.

Figure 3:
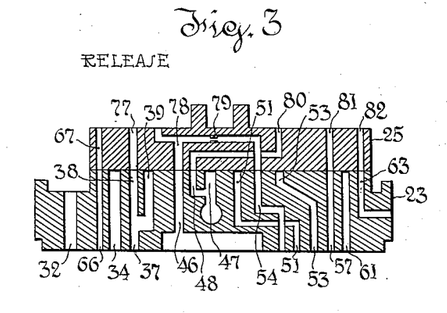
Fig. 3 is a view similar to a portion of Fig. 1, showing the rotary valve in release position on its seat.

Referring now to Fig. 3, which shows release position, it will be observed that a portion of the port 67 still registers with governor port 66 and that a through port 77 in the rotary valve supplies main reservoir air to the brake pipe port 38 for the purpose of developing a sharp releasing wave in the brake pipe. At this position a through port 78 registers with the port 46 and is in communication through a choke 79 with the equalizing reservoir port 54. Another through port 80, known as the warning port, supplies main reservoir air to the small exhaust connection 48 to warn the engineer that the valve is in full release position. Through port 81 in the rotary valve supplies main reservoir air to the chamber port 57 and consequently to the measuring chamber 59. A through port 82 supplies main reservoir air to the timing chamber port 63.

In the maintaining position (Fig. 4) the ports in the valve seat are blanked except as specified below. A loop port 83 in the rotary valve connects port 46, which communicates with the space above the equalizing discharge diaphragm, with the equalizing reservoir port 54. An extension of the port 83, restricted by a choke 84, establishes a branch communication with the measuring chamber port 57. A second loop port 85, restricted by a choke 86, establishes a slow flow communication from the timing chamber port 63 to the exhaust port 47.

In service position (Fig. 5) the ports in the rotary valve seat are blanked except as follows: A loop port 87 connects the equalizing reservoir port 54 with the port 46 which leads to the space above the equalizing discharge diaphragm. A restricted branch 88 leads from the port 87 and communicates with the exhaust port branch 48.

Figure 5:
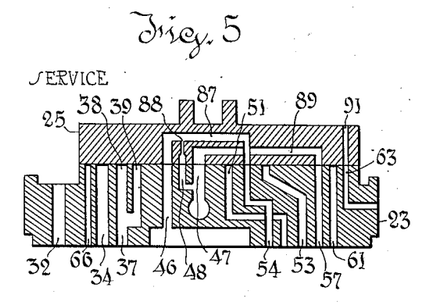
Fig. 5 is a similar view showing the rotary valve in service position.

A loop port 89 connects the measuring chamber port 57 with the exhaust port 47. A through port 91 in the rotary valve supplies main reservoir air to the timing chamber port 63.

Figure 6:
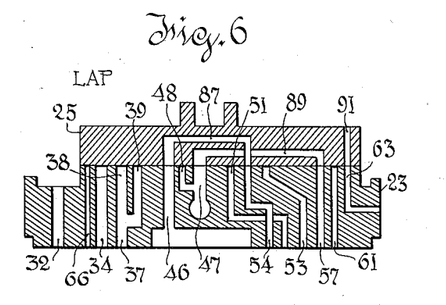
Fig. 6 is a view showing the rotary valve in lap position.

In lap position all ports are blanked except as follows: Port 91 continues to supply main reservoir air to the port 63. The port 89 continues to connect the measuring chamber port 57 with the exhaust port 47. The loop port 87 continues to connect the ports 54 and 46 but the restricted branch connection 88 is out of register with the exhaust port 48.

In emergency position (Fig. 7) a through port 92 supplies main reservoir air to the emergency relay valve port 61. A through port 93 supplies main reservoir air to the control reservoir port 51. The loop port 94 with a plurality of freely communicating branches, connects the brake pipe port 39, the port 46, the exhaust port 47, the equalizing reservoir port 54 and the measuring chamber port 57.

The measuring chamber 59 is provided with a circular aperture against which is mounted a combined gasket and diaphragm 95. This is clamped in place by a cap 96. Clamped to the center of the diaphragm are two dished thrust members 97, 98 the lower one having a stem 99 which passes through the center of the diaphragm and the thrust member 97. The parts are held by a nut 101.

The diaphragm is urged upward by a coiled compression spring 103 whose strength is such as to resist a differential of pressures acting downward on the diaphragm of approximately 1 pound per square inch. A boss 102 in the chamber 59 limits upward motion of the diaphragm.

The space within the cap 96 below the diaphragm 95 is in communication with the brake pipe through a branch 104 of the pipe 35. The branch 104 leads from the pipe 35 between the double-heading cock and the engineer's brake valve. Consequently the diaphragm 95 is subject to measuring chamber pressure on its upper side and brake pipe pressure on its lower side. The stem 99 is in telescoping thrust relation with a pilot of a poppet valve 105. This valve controls flow from a chamber 106 which is connected by a branch pipe 107 with the main reservoir pipe 31. The valve is urged in a closing direction by main reservoir pressure and also by a coiled compression spring 108.

Leading from the measuring chamber 59 is another aperture in which is mounted a combined choke and valve seat member 109. Coacting with the lower face of the member 109 is a valve member which takes the form of a flexible diaphragm 111 with an annular valve rib 112 on its upper face. The member 111 is retained by a metal disk 113 which guides a thrust pin 114. The thrust pin 114 is in thrust relation with a bearer plate 115 which engages the upper side of a larger diaphragm 116. This diaphragm is clamped by a cup-shaped cap 117 and its lower face is subject to pressure in the timing chamber 65, the pressure being communicated by a port 118. The space between the diaphragms 111 and 116 is vented to atmosphere, as clearly shown in the drawings. The space around the lower end of the valve seat member 109 is connected by a passage 119 with the branch pipe 104 and consequently with the brake pipe.

Figure 15:
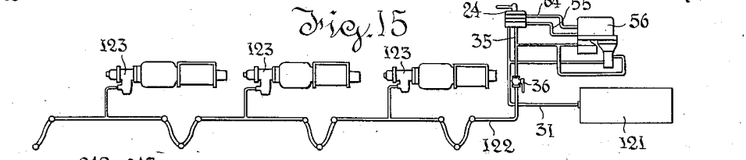
Fig. 15 is a diagram showing the units connected up in a train.

Referring now to Fig. 15, the main reservoir is shown at 121. The engineer's brake valve is indicated generally by the numeral 24, applied to the cap of the valve. The equalizing reservoir and the related parts are indicated by the numeral 56. The brake pipe is indicated by the numeral 122, and the triple valves are indicated by the numeral 123. It will be understood that these triple valves are of the quick service venting type, and that while only a few of them can be shown, the utility of the invention arises with trains of sufficient length to be subject to brake pipe gradient or taper. This condition is encountered particularly with trains of a length of 100 or more cars.

OPERATION OF EMBODIMENTS SHOWN IN FIGS. 1 TO 7

The valve above described performs the ordinary functions of the H—6 brake valve and certain additional functions. As the ordinary functions are familiar to those skilled in the art, they will merely be enumerated without tracing the ports through which the flow occurs. Connecting ports which control functions novel in the present invention will be enumerated in detail.

*Full release position (Fig. 3)*

In this position main reservoir air is supplied to the low pressure governor top, to the brake pipe, to a space above the equalizing discharge piston and through a choke to the equalizing reservoir. There is also flow through the warning port to exhaust.

The port 81 registers with port 57 and supplies main reservoir air to the measuring chamber 59. Port 82 registers with the timing chamber port 63 and supplies main reservoir air to the timing chamber 65. It follows therefore that the measuring chamber 59 is charged to main reservoir pressure in full release position, and the bleed port 109 is closed. Valve 105 may open to feed main reservoir air to the brake pipe.

*Running position (Fig. 1)*

Figures 1, 2:
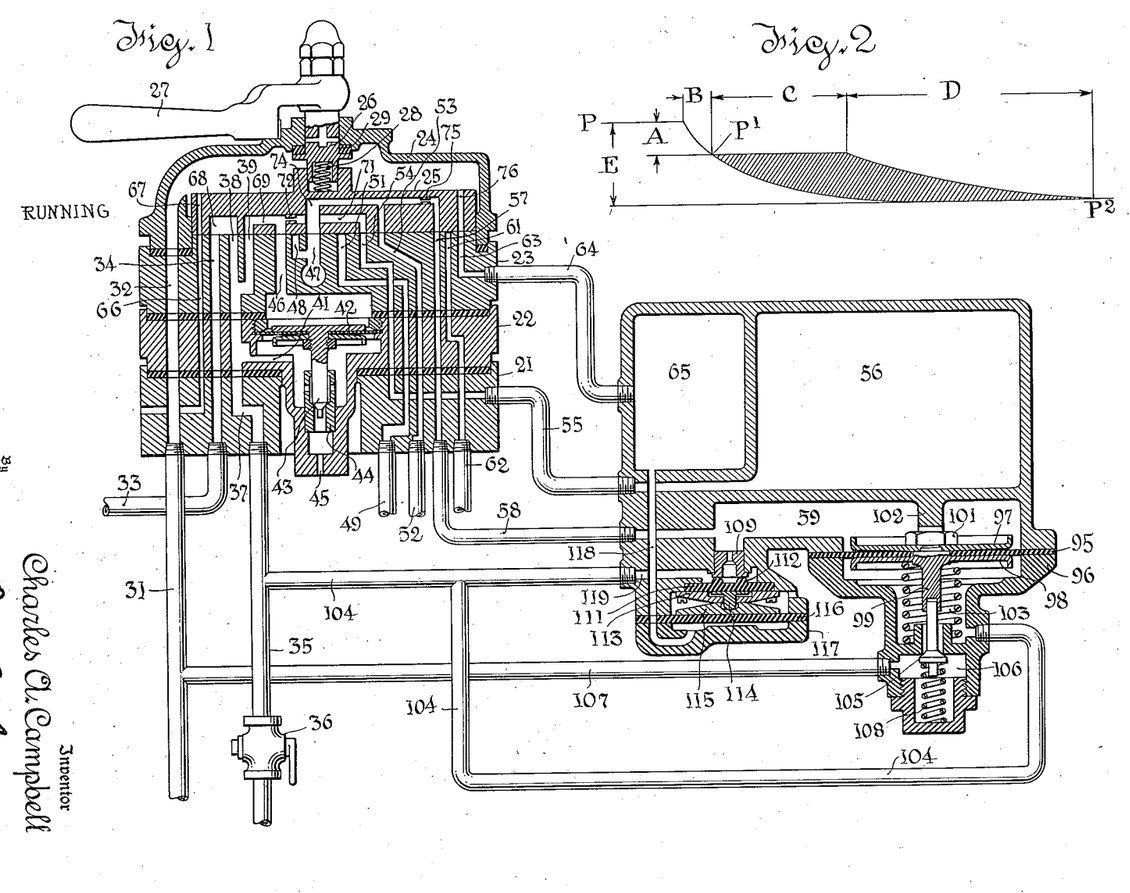
Fig. 1 is a vertical axial section through an engineer's brake valve in running position, equipped with an equalizing reservoir, measuring chamber, automatic maintaining valve, timing chamber and timing valve.
Fig. 2 is a diagram illustrating the characteristics of brake pipe pressure adjacent the brake valve at the commencement of a service application.

In this position the direct supply of main reservoir air to the brake pipe is cut off and the feed valve port is connected with the brake pipe with the space above the equalizing discharge diaphragm and with the equalizing reservoir. In the last-named connection the choke 72 is effective to control flow to and from the equalizing reservoir. The measuring chamber 59 is vented through pipe 58, port 57, choke 75 and port 74 to the exhaust port 47. The release pipe is vented as usual. The port 76 furnishes main reservoir air to the timing chamber 65 so that this chamber remains charged at main reservoir pressure. The purpose of inserting the choke 75 in the vent passage from the measuring chamber 59 is to secure slow reduction of pressure in chamber 59 so that if brake pipe pressure should fall rapidly before the regular feed valve can respond, the diaphragm 95 will function to open the valve 105 and assist the feed valve in maintaining pressure in the brake pipe.

*Maintaining position (Fig. 4)*

Figure 4:
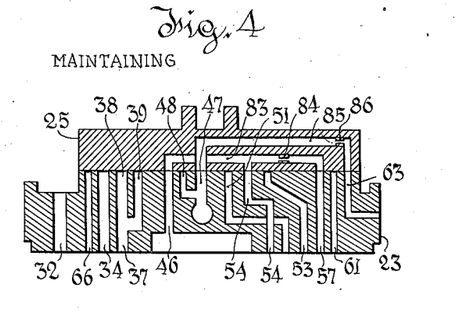
Fig. 4 is a similar view showing the rotary valve in maintaining position.

It is in this position that the mechanism herein described performs its most important function. It is understood that the brake valve would be moved to this position only under conditions when a substantial brake pipe pressure gradient is encountered, and will be left there during the maintaining cycle which is about to be described.

In this position, the brake pipe ports are blanked, as are the feed valve port, the low pressure governor port, the control reservoir port, the release port, and the emergency relay valve port.

The space above the equalizing diaphragm 42 is connected by the ports 46, 83 and 54, freely with the equalizing reservoir and through the choke 84, port 57 and pipe 58 with the measuring chamber 59. From this it follows that there is a retarded equalization of pressure between the measuring chamber and the equalizing reservoir, which operates through the equalizing discharge valve diaphragm 42 to open the equalizing discharge valve. The capacity of the measuring chamber 59 is such as to produce approximately a five pound reduction of pressure in the equalizing reservoir 56. The result is to reduce the pressure in the brake pipe 35 five pounds at the engineer's brake valve. This is sufficient to start the serial quick service venting of the triple valves. The timing chamber 65 is connected through port 63, choke 86, port 85, with the exhaust port 47, so that the pressure in the timing chamber 65 immediately starts a gradual descent from main reservoir pressure toward atmospheric pressure. It will be understood that during the maintaining cycle, the valve is left in maintaining position and is not moved to lap position.

Referring now also to Fig. 2, let it be assumed that P represents the normal brake pipe pressure under running conditions at the locomotive. The operation of the equalizing discharge valve will reduce the pressure to the point P', brake pipe pressure falling in the time interval B through the pressure interval A, here assumed to be 5 pounds. If no means were provided to compensate for back flow of air in the brake pipe, the total drop in pressure at the brake pipe would be represented by E and the pressure would follow a curve approximating that on the lower margin of the shaded area in Fig. 2. However, as soon as the connection of the chambers 56 and 59 has functioned to cause the equalizing discharge valve to reduce brake pipe pressure by the amount A, the pressure P' existing in the chamber 59 will establish a counteracting feed through the action of the diaphragm 95 and valve 105. It being remembered that the spring 103 balances a pressure of about 1 pound per square inch, it will be seen that as soon as brake pipe pressure falls 1 pound below pressure P' the valve 105 will open and feed main reservoir air to the brake pipe. The effect is to maintain brake pipe pressure adjacent the engineer's brake valve at approximately the pressure P'. If this action continued indefinitely, we would have what is known as constant maintenance.

Means are provided to prevent the constant maintenance after a time interval C (Fig. 2). This means comprises the timing chamber 65, which, as explained above, is being vented at a restricted rate to atmosphere. The falling pressure in the chamber 65 is acting on the lower face of the large diaphragm 116 and thus holding the valve rib 112 in sealing relation with the seat portion below choke 109. At the same time brake pipe pressure is acting on the upper side of the smaller diaphragm 111. When the pressure in the timing chamber 165 reaches a definite value, determined by the areas of the diaphragms just mentioned, diaphragm 111 will move downward so that rib 112 clears its seat and permits equalizing flow from the measuring chamber 59 and the connected equalizing reservoir 56 to the brake pipe. The pressure differential between chambers 59 and 56 on the one hand, and the brake pipe, on the other hand, is not great, so that the choke 109 may be of relatively large size, a fact which avoids risk of clogging or throttling of the choke port.

Approach to equalization of brake pipe pressure and the pressure in the measuring chamber 59, entails a gradual closure of the valve 105 so that the rate of feed of main reservoir air to the brake pipe is subject to gradual reduction during the time interval D (Fig. 2). Consequently, brake pipe pressure ultimately reaches the value $P^2$ in three stages. In the time interval B there is a rapid drop, sufficient to initiate quick service. In the period C there is little or no drop in brake pipe pressure. In the period D there is a gradual reduction of brake pipe pressure to the pressure $P^2$. The interval E, between the pressure P and the final pressure $P^2$, is equal to the rapid drop which would occur by making 5 pounds reduction at the engineer's brake valve and then allowing brake pipe pressure to level off.

By delaying the fall of brake pipe pressures through the intervals C and D the slack in the train is caused to be bunched before the full application at the forward end of the train occurs.

The purpose of using the choke 84 is to delay the development of pressure in the measuring chamber 59 until after the triple valves have made their quick service venting response. In this way the diaphragm 95 and valve 105 are prevented from functioning to feed air to the brake pipe until the quick service response is assured.

*Service position (Fig. 5)*

This figure exhibits the ordinary characteristics of service position in which the equalizing reservoir is connected with a space above the equalizing discharge piston and the two are vented to atmosphere at a restricted rate. In this position port 57 is connected by port 89 with the exhaust port 47 so that the measuring chamber 59 is vented to atmosphere and the valve 105 can not be opened. The port 91 feeds main reservoir air to port 63 so that timing chamber 65 is charged or maintained at main reservoir pressure.

*Lap position (Fig. 6)*

In this position the connections described with reference to service are maintained, except that the restricted exhaust connection from the equalizing reservoir is closed.

*Emergency position (Fig. 7)*

Figure 7:
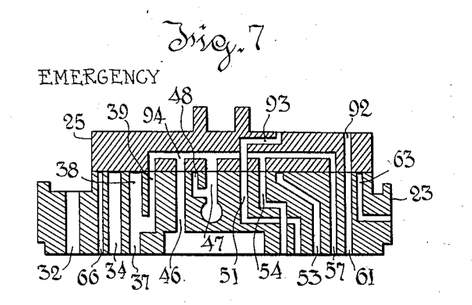
Fig. 7 is a view showing the rotary valve in emergency position.

In emergency position the brake pipe, the space above the equalizing discharge piston, and the equalizing discharge reservoir are connected together and to the exhaust port. At the same time the measuring chamber port 57 is connected to the exhaust port so that valve 105 will certainly be closed. The port 93 supplies main reservoir air to control reservoir pipe and the port 92 registers with port 61 and supplies main reservoir air to the emergency relay valve. The timing chamber port 63 is blanked. In this position the valve merely functions to vent the brake pipe rapidly, and the only function directly connected with the novel mechanism of the present invention is the venting of the measuring chamber 59 to prevent the maintaining mechanism from feeding any air to the brake pipe.

MODIFICATIONS

Under some conditions it might be unnecessary to provide for constant maintenance through the period C of Fig. 2. In other words, the maintenance characteristics might be those shown in Fig. 9. The initial opening of the equalizing discharge valve might cause the normal brake pipe pressure P to drop to a value $P^3$. The drop would be through the interval A', here assumed to be 5 pounds, through a time interval B'. Thereafter the pressure would drop through a time interval D' to a final value $P^4$, but the rate would be retarded by a maintaining action which continually diminished. Thus the pressure curve would follow the upper side of the shaded area in Fig. 9 instead of following the lower side of the shaded area, as it would normally do without pressure maintenance.

Referring first to Fig. 1, this change in function could be attained by eliminating the timing chamber 65, the means for charging it, the double diaphragm valve mechanism comprising the parts 111 to 118 inclusive. In such case the choke 109 would start to vent the chamber 59 as soon as the chamber 59 was charged. However, it is desirable to subject the flow through the port 109 to control by the rotary valve to avoid waste of air and other problems, and a modification of the invention in which the choke 109 is relocated so as to be properly controlled, is illustrated in Figs. 8 and 10 to 14 inclusive.

In these figures, ports which are functionally identical with ports in Fig. 1 are given similar reference numerals, increased by 200, as compared to the reference numerals in Fig. 1. It is unnecessary to trace the construction in detail beyond pointing out that in Figs. 8 and 10 to 14 inclusive, there are no parts corresponding to the following parts which appear in Fig. 1 and Figs. 3 to 7 inclusive. The parts so omitted are the port 76, port 82, port 85 and choke 86, port 91, port 63, pipe 64, timing chamber 65, diaphragm 111 with valve rib 112, diaphragm retainer 113, thrust member 114, thrust member 115, diaphragm 116, cap 117, ports 118 and 119.

Figures 8, 9:
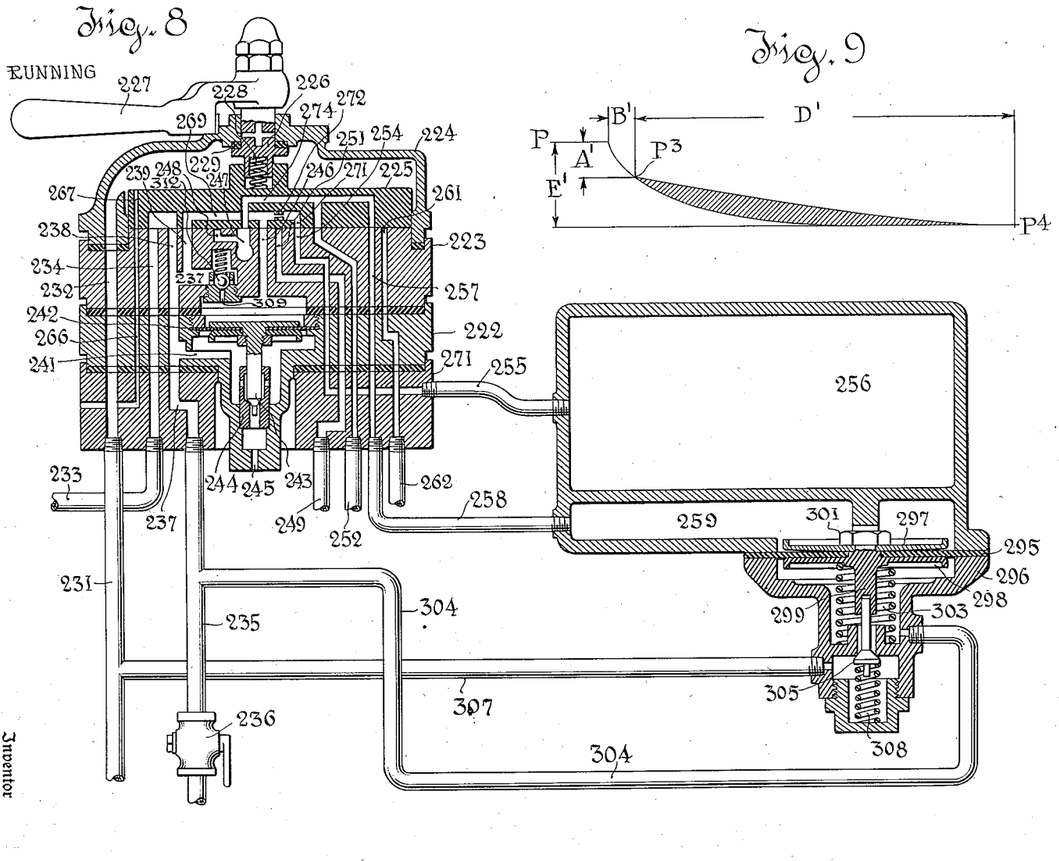
Fig. 8 is a view similar to Fig. 1, showing an embodiment in which the timing chamber and the timing valve controlled thereby are omitted.
Fig. 9 is a diagram similar to Fig. 2 but illustrating the operative characteristics of the mechanism shown in Fig. 8.
Figure 10:
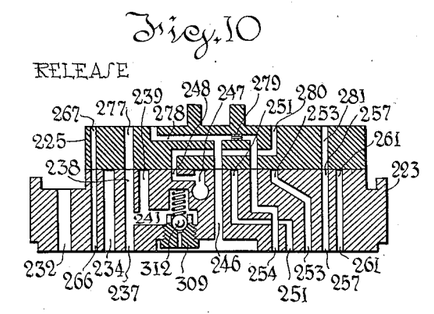
Fig. 10 is a fragmentary view similar to a portion of Fig. 8, showing the rotary valve in release position on its seat.
Figure 11:
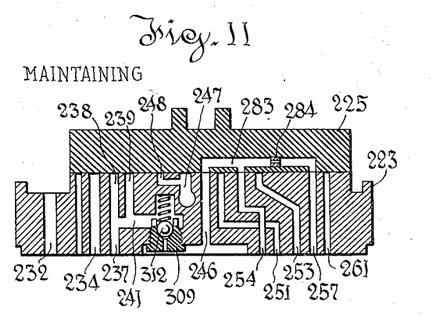
Fig. 11 is a similar view showing the rotary valve in maintaining position.
Figure 12:
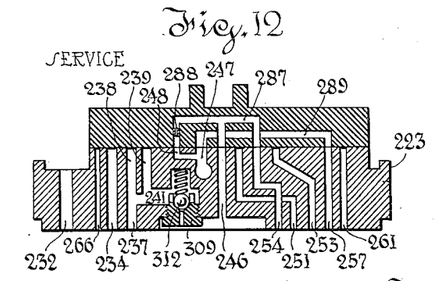
Fig. 12 is a similar view showing the rotary valve in service position.
Figure 13:
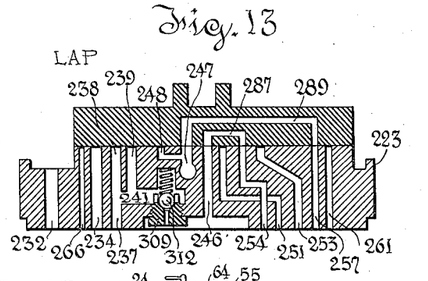
Fig. 13 is a similar view showing the rotary valve in lap position.
Figure 14:
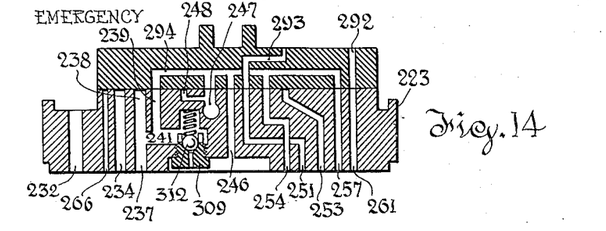
Fig. 14 is a similar view showing the rotary valve in emergency position.

In Fig. 8 the following parts are relocated: The choke 309 which takes the place of the choke 109 is interposed between the space above the equalizing diaphragm 242 and permits flow directly to the brake pipe passage 237. The spring urged ball check valve 312 closes against flow from the port 237 to the space above the diaphragm 242, and the spring-loading offers a slight resistance to flow in the reverse direction. Although the location of similarly numbered ports in Fig. 8, &c., differs slightly from the location of ports in Fig. 1, &c., it should be remembered that the illustration is diagrammatic and this relocation is nothing more than an effort to provide space for the choke 309 and the valve 312. Functionally, similarly numbered ports in the two embodiments are identical. The chief functional difference is in maintaining position (see Fig. 11).

In this position the port 257 is connected through port 283 and choke 284 to the equalizing reservoir port 254 and the port 246 leading to the space above the equalizing discharge diaphragm. Consequently, when the valve is moved to the position of Fig. 11 there is a gradual equalization between the chambers 256 and 259. As soon as pressure in the chamber 259 is developed and brake pipe pressure falls below the equalized pressure in 256 and 259, back flow through the choke 309 to the brake pipe starts. Whenever pressure in chamber 259 is higher than brake pipe pressure, the diaphragm 295 and the valve 305 function to feed main reservoir air to the brake pipe. This feeding action starts at $P^3$ in Fig. 9 and continues at a diminishing rate because of the depletion of pressure in chambers 259 and 256 as the result of flow through a choke 309 to the brake pipe.

Both modifications are characterized by the fact that brake pipe pressure is subject at the engineer's brake valve to initial limited reduction sufficient to start quick service venting. The preferred arrangement is to effect this action through an equalizing discharge valve. When this initial reduction is had, and regardless of how it is produced, a maintaining action is started and so controlled that it ultimately fades out when brake pipe pressure levels off at the value which would have been produced normally in conventional systems by the initial reduction made at the engineer's brake valve. The tapering effect of the maintaining action may be started immediately, as indicated in Fig. 9, or may follow a limited period of constant maintenance, as indicated in Fig. 2.

While the mechanisms disclosed in the drawings are preferred for practical reasons, it is recognized that other mechanisms involving the novel operative principles herein disclosed, may be devised, and no necessary limitation to the structures described in detail herein, is implied.

What is claimed is,—

1. The method of delaying the full application of the front brakes of a long train equipped with an automatic air brake system including a brake pipe and triple valves connected thereto, despite the existence under running conditions of a brake pipe pressure gradient, which method consists in producing a brake pipe pressure reduction sufficient to effect initial service response of said triple valves, and then feeding compressed air to the front end of the brake pipe at two different successive rates, the first rate being initially sufficient to arrest further depression of brake pipe pressure and at least the second being characterized by diminishing feed whereby brake pipe pressure at the front of the train gradually falls to a point at which the pressure throughout the brake pipe levels off.

2. The method of delaying the full application of the front brakes of a long train equipped with an automatic air brake system including a brake pipe and triple valves connected thereto, despite the existence under running conditions of a brake pipe pressure gradient, which method consists in producing a brake pipe pressure reduction sufficient to effect the initial service response of the triple valves, then feeding compressed air to the forward end of the brake pipe at a rate sufficient to prevent substantial further depression of brake pipe pressure, maintaining such rate for a substantial period, and thereafter gradually diminishing the rate of feed of air until brake pipe pressure levels off.

3. The method of delaying the full application of the front brakes of a long train equipped with an automatic brake system including a brake pipe and triple valves connected thereto, despite the existence under running conditions of a brake pipe pressure gradient, which method consists in producing a brake pipe pressure reduction sufficient to effect the initial service response of the triple valves, then feeding compressed air to the forward end of the brake pipe at a rate sufficient to prevent substantial further depression of brake pipe pressure, maintaining such rate for a substantial period, and thereafter gradually diminishing the rate of feed of air over a longer period until brake pipe pressure levels off.

4. In an air brake system, the combination of a source of fluid under pressure; an engineer's brake valve fed thereby and including a manually shiftable valve, an equalizing reservoir and an equalizing discharge valve; a brake pipe connected with said engineer's brake valve, triple valves connected with said brake pipe and including quick service venting means; means controlled by the manually shiftable valve and active in one position thereof to reduce equalizing reservoir pressure a definite amount sufficient to initiate quick service venting by the action of the equalizing discharge valve and the triple valves; means responsive to such lowered pressure in the equalizing reservoir to supply fluid under pressure to the brake pipe to resist substantial fall of brake pipe pressure below equalizing reservoir pressure; and means effective in the stated position of the manually operated valve to afford a restricted equalizing connection between the brake pipe and the equalizing reservoir.

5. In an air brake system, the combination of a source of fluid under pressure; an engineer's brake valve fed thereby and including a manually shiftable valve, an equalizing reservoir and an equalizing discharge valve; a brake pipe connected with said engineer's brake valve; triple valves connected with said brake pipe and including quick service venting means; means controlled by the manually shiftable valve and active in one position thereof to reduce equalizing reservoir pressure a definite amount sufficient to initiate quick service venting by the action of the equalizing discharge valve and the triple valves; means responsive to such lowered pressure in the equalizing reservoir to supply fluid under pressure to the brake pipe to resist a substantial fall of brake pipe pressure below equalizing reservoir pressure; means effective in the stated position of said manually operable valve to afford an equalizing bleed connection between the brake pipe and the equalizing reservoir; and timing means rendered active by motion of the manually actuated valve to the stated position and serving to inhibit the equalizing action of said bleed connection through a definite time period.

6. In an air brake system, the combination of a source of fluid under pressure; an engineer's brake valve fed thereby and including a manually shiftable valve, an equalizing reservoir and an equalizing discharge valve; a brake pipe connected with said engineer's brake valve; triple valves connected with said brake pipe and including quick service venting means; a measuring chamber; means effective in one position of the manually shiftable valve to connect the equalizing reservoir and measuring chamber; means responsive to pressure in the measuring chamber to feed air under pressure to the brake pipe; and means effective in said position of the manually shiftable valve to reduce the pressure in the measuring chamber at a rate controlled at least in part by brake pipe pressure.

7. In an air brake system, the combination of a source of fluid under pressure; an engineer's brake valve fed thereby and including a manually shiftable valve, an equalizing reservoir and an equalizing discharge valve; a brake pipe connected with said engineer's brake valve; triple valves connected with said brake pipe and including quick service venting means; a measuring chamber; means effective in one position of the manually shiftable valve to connect the equalizing reservoir and measuring chamber;

means responsive to pressure in the measuring chamber to feed air under pressure to the brake pipe; and means for establishing an equalizing connection of limited flow capacity between the measuring chamber and the brake pipe.

8. In an air brake system, the combination of a source of fluid under pressure; an engineer's brake valve fed thereby and including a manually shiftable valve, an equalizing reservoir and an equalizing discharge valve; a brake pipe connected with said engineer's brake valve; triple valves connected with said brake pipe and including quick service venting means; a measuring chamber; means effective in one position of the manually shiftable valve to connect the equalizing reservoir and measuring chamber; means responsive to pressure in the measuring chamber to feed air under pressure to the brake pipe; and timing means rendered effective by motion of said manually shiftable valve to the stated position, to open after a time interval an equalizing connection of limited flow capacity between the measuring chamber and the brake pipe.

9. The combination defined in claim 8, in which the timing means comprises a normally charged chamber, slowly vented through the manually shiftable valve in said position.

10. The combination defined in claim 8, in which the timing means comprises a normally charged chamber, slowly vented through the manually shiftable valve in said position, and a valve controlling the equalizing passage and urged in a closing direction by pressure in said chamber.

11. The combination of a brake pipe; an engineer's brake valve connected thereto and comprising a manually shiftable valve, and equalizing discharge means controlled thereby and including an equalizing volume; means effective in one position of the manually shiftable valve to reduce the pressure in the equalizing volume a limited amount; means actuated by such reduced pressure and serving to feed air under pressure to the brake pipe to maintain a similar pressure in the brake pipe; and means effective in such position to reduce the pressure in the equalizing volume further at a rate controlled at least in part by brake pipe pressure.

12. The combination of a brake pipe; an engineer's brake valve connected thereto and comprising a manually shiftable valve, and equalizing discharge means controlled thereby and including an equalizing volume; means effective in one position of the manually shiftable valve to reduce the pressure in the equalizing volume a limited amount; means actuated by such reduced pressure and serving to feed air under pressure to the brake pipe to maintain a similar pressure in the brake pipe; and means effective in such position to establish slow equalizing flow between said volume and the brake pipe.

13. The combination of a brake pipe; an engineer's brake valve connected thereto and comprising a manually shiftable valve, and equalizing discharge means controlled thereby and including an equalizing volume; means effective in one position of the manually shiftable valve to reduce the pressure in the equalizing volume a limited amount; means actuated by such reduced pressure and serving to feed air under pressure to the brake pipe to maintain a similar pressure in the brake pipe; and means effective after a definite time interval in such position, to establish slow equalizing flow between said volume and the brake pipe.

14. The combination of a brake pipe; an engineer's brake valve connected thereto and comprising a manually shiftable valve and equalizing discharge means controlled thereby and including an equalizing volume; a measuring chamber; means effective in a maintaining position of the manually shiftable valve to connect said volume and chamber; means responsive to pressure in said chamber and serving when such pressure exceeds brake pipe pressure to feed air to the brake pipe to maintain a similar pressure therein; and means effective in said maintaining position to diminish the pressure in the measuring chamber at a rate controlled at least partially by brake pipe pressure.

15. The combination of a brake pipe; an engineer's brake valve connected thereto and comprising a manually shiftable valve and equalizing discharge means controlled thereby and including an equalizing volume; a measuring chamber; means effective in a maintaining position of the manually shiftable valve to connect said volume and chamber; means responsive to pressure in said chamber and serving when such pressure exceeds brake pipe pressure to feed air to the brake pipe to maintain a similar pressure therein; and means effective in said maintaining position to establish slow equalizing flow between the measuring chamber and the brake pipe.

16. The combination of a brake pipe; an engineer's brake valve connected thereto and comprising a manually shiftable valve and equalizing discharge means controlled thereby and including an equalizing volume; a measuring chamber; means effective in a maintaining position of the manually shiftable valve to connect said volume and chamber; means responsive to pressure in said chamber and serving when such pressure exceeds brake pipe pressure to feed air to the brake pipe to maintain a similar pressure therein; and means effective in said maintaining position to establish slow equalizing flow between the measuring chamber, the equalizing volume, and the brake pipe.

17. The combination of a brake pipe; an engineer's brake valve connected thereto and comprising a manually shiftable valve and equalizing discharge means controlled thereby and including an equalizing volume; a measuring chamber; means effective in a maintaining position of the manually shiftable valve to connect said volume and chamber; means responsive to pressure in said chamber and serving when such pressure exceeds brake pipe pressure to feed air to the brake pipe to maintain a similar pressure therein; and means effective after a definite time interval in said maintaining position to establish slow equalizing flow between the measuring chamber and the brake pipe.

18. The combination defined in claim 17, in which the means effective after a definite time interval comprises a timing chamber connected for slow pressure changing flow by the manually shiftable valve when in said maintaining position, and a normally closed valve opened by change of pressure in said timing chamber and controlling said equalizing flow.

19. The combination defined in claim 15, in which the manually shiftable valve has a release position in which the measuring chamber is charged to a pressure higher than the normal running brake pipe pressure.

20. The combination defined in claim 15 in which the manually shiftable valve has a running position in which the measuring chamber is slowly vented.

21. The combination defined in claim 15 in which the manually shiftable valve has a running position in which the equalizing volume is in restricted communication with the remainder of the equalizing discharge means.

22. The combination defined in claim 15 in which the manually shiftable valve has an emergency position in which the measuring chamber is freely vented.

23. The combination defined in claim 15 in which the parts are so arranged that the pressure maintained in the brake pipe during maintaining action is only slightly lower than pressure simultaneously existing in the measuring chamber and the connected equalizing volume; whereby a relatively large equalizing port can be used to ensure slow equalizing flow to the brake pipe.

24. In an air brake system, the combination of a source of fluid under pressure; an engineer's brake valve fed thereby and including a manually shiftable valve, an equalizing reservoir and an equalizing discharge valve; a brake pipe connected with said engineer's brake valve; triple valves connected with said brake pipe and including quick service venting means; a measuring chamber; means effective in one position of the manually shiftable valve to connect the equalizing reservoir and measuring chamber; means responsive to pressure in the measuring chamber to feed air under pressure to the brake pipe; means effective in said position of the manually shiftable valve to reduce the pressure in the measuring chamber at a slow rate; and means for preventing said pressure from falling below brake pipe pressure.

25. The combination of a brake pipe; an engineer's brake valve connected thereto and comprising a manually shiftable valve, and equalizing discharge means controlled thereby and including an equalizing volume; means effective in one position of the manually shiftable valve to reduce the pressure in the equalizing volume a limited amount; means actuated by such reduced pressure and serving to feed air under pressure to the brake pipe to maintain a similar pressure in the brake pipe; and means effective in such position to reduce the pressure in the equalizing volume further at a slow rate to equality with brake pipe pressure.

26. The combination of a brake pipe; an engineer's brake valve connected thereto and comprising a manually shiftable valve and equalizing discharge means controlled thereby and including an equalizing volume; a measuring chamber; means effective in a maintaining position of the manually shiftable valve to connect said volume and chamber; means responsive to pressure in said chamber and serving when such pressure exceeds brake pipe pressure to feed air to the brake pipe to maintain a similar pressure therein; means effective in said maintaining position to diminish slowly the pressure in the measuring chamber; and means for terminating such diminution when equality with brake pipe pressure is reached.

CHARLES A. CAMPBELL.